United States Patent
Tucek et al.

(10) Patent No.: US 10,360,206 B2
(45) Date of Patent: Jul. 23, 2019

(54) LATCH-FREE CONCURRENT SEARCHING

(71) Applicant: Hewlett Packard Enterprise Development LP, Houston, TX (US)

(72) Inventors: Joseph Tucek, Palo Alto, CA (US); Mark Lillibridge, Mountain View, CA (US); Harumi Kuno, Cupertino, CA (US); Goetz Graefe, Madison, WI (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 184 days.

(21) Appl. No.: 15/107,392

(22) PCT Filed: Jan. 16, 2014

(86) PCT No.: PCT/US2014/011873
§ 371 (c)(1),
(2) Date: Jun. 22, 2016

(87) PCT Pub. No.: WO2015/108521
PCT Pub. Date: Jul. 23, 2015

(65) Prior Publication Data
US 2017/0004164 A1    Jan. 5, 2017

(51) Int. Cl.
*G06F 17/00* (2006.01)
*G06F 16/23* (2019.01)
*G06F 16/901* (2019.01)
*G06F 16/2455* (2019.01)

(52) U.S. Cl.
CPC ...... *G06F 16/2343* (2019.01); *G06F 16/2315* (2019.01); *G06F 16/2455* (2019.01); *G06F 16/9027* (2019.01)

(58) Field of Classification Search
CPC ............... G06F 1/2343; G06F 16/2455; G06F 16/2315; G06F 16/9027
USPC .................................................. 707/600–899
See application file for complete search history.

(56) References Cited

U.S. PATENT DOCUMENTS

| | | |
|---|---|---|
| 7,293,028 B2 | 11/2007 | Cha et al. |
| 7,966,298 B2 | 6/2011 | Bruso et al. |
| 8,176,023 B2 | 5/2012 | Graefe |
| 8,219,587 B2 | 6/2012 | Odaira |
| 2003/0033328 A1 | 2/2003 | Cha et al. |
| 2003/0050925 A1 | 3/2003 | Moskovich et al. |
| 2010/0082664 A1 | 4/2010 | Odaira |
| 2012/0221531 A1 | 8/2012 | Liedes |

(Continued)

OTHER PUBLICATIONS

Bender, M.A. et al., Concurrent Cache-Oblivious B-Trees, (Research Paper), Jul. 18-20, 2005, 10 Pages.

(Continued)

*Primary Examiner* — Isaac M Woo
(74) *Attorney, Agent, or Firm* — Hewlett Packard Enterprise Patent Department (57) ABSTRACT

Systems and methods associated with latch-free searching are disclosed. One example method includes receiving a key identifying data to be retrieved from a tree-based data structure. The method also includes performing a concurrent, latch-free search of the tree-based data structure until a leaf node is reached. The method also includes validating the leaf node. The method also includes retreading a portion of the search if the leaf node fails validation.

14 Claims, 6 Drawing Sheets

(56) References Cited

U.S. PATENT DOCUMENTS

2013/0166553 A1 6/2013 Yoon et al.
2013/0346725 A1 12/2013 Lomet et al.
2014/0040199 A1* 2/2014 Golab ............... G06F 17/30309
707/634

OTHER PUBLICATIONS

Kissinger, T. et al., KISS-tree: Smart Latch-free In-memory Indexing on Modern Architectures, (Research Paper), May 21, 2012, 8 Pages.
PCT Search Report/Written Opinion~Application No. PCT/US2014/011873 dated Oct. 27, 2014~9 pages.
Sewall, J. et al., PALM: Parallel Architecture-Friendly Latch-Free Modifications to B+ Trees on Many-Core Processors, (Research Paper), Aug. 15, 2011, 12 Pages.
Sultana et al., "Concurrent B-trees with Lock-free Techniques", Oct. 23, 2011, 28 pages.
Levandoski et al., "The Bw-Tree: A B-tree for New Hardware Platforms", ICDE '13 Proceedings of the 2013 IEEE International Conference on Data Engineering (ICDE 2013), 2013, pp. 302-313.
International Preliminary Report on Patentability received for PCT Patent Application No. PCT/US2014/011873, mailed on Jul. 28, 2016, 6 pages_.
Anastasia Braginsky and Erez Petrank, "A Lock-Free B+tree," Jun. 19, 2012, pp. 1-63.

* cited by examiner

LATCH-FREE CONCURRENT SEARCHING

BACKGROUND

Conventional relational databases are typically organized according to some form of tree data structure. This allows searches for data to rapidly traverse the data structure to return and/or modify queried data. To further improve efficiency, many systems employing relational databases run queries concurrently. To prevent processes from modifying a node in the database while other processes are reading the node, and to prevent processes from reading or modifying a node while a process is modifying the node, conventional systems typically employ some form of latching. This is done to ensure that for example, a search does not go astray because a read was performed on data being modified by a concurrent process.

However, waiting for another process to finish modifying a node may delay response times of some queries. Some systems attempt to avoid taking latches by avoiding in-place modifications of data. Instead, these systems may create a modified copy of a node and then atomically swing a pointer in the parent node from the original node to the modified copy. However, this creates garbage data that needs to be collected and in some instances may be slower than modifying data in-place.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems and methods associated with latch-free, concurrent searching are described. In various examples, latch-free, concurrent searching may be achieved by ignoring latches during initial traversals of a tree when searching for data identified in a query. Because searching, processes do not acquire latches in read mode to protect against concurrent modification of the tree nodes, concurrent processes may be performing in place modifications of nodes being traversed by searching processes. This may cause a searching process to read bad data, which may lead the searching process astray. Upon reaching a leaf node that a searching process believes may contain data that the searching process is seeking, that leaf node may be validated to ensure that it is the correct leaf node. If a validation test fails, the searching process may retread a portion of the search.

By way of illustration, upon discovering that the search has gone astray, the searching process may back up one or more nodes and then resume the search hoping to not go astray again. If the searching process repeatedly goes astray, (e.g., when there is high contention over a portion of a database) this retreading after reaching a leaf node that fails validation may occur multiple times, until ultimately the searching process determines that latches should be acquired in read mode to ensure completion of the search. Validation tests may be designed to ensure that a leaf node reached by a searching process is a leaf node that the search would reach without interference from concurrent modifications of nodes traversed by the searching process. If the leaf node reached passes the validation test, then the data requested should be in that leaf node if the data is in fact in the database. Numerous validation tests are possible and disclosed below. One example validation test may include determining if a key associated with the data searched for is between fence keys of the leaf node reached. Other checks may also be used to ensure that, for example, a search does not go astray by reading an out-of-date or temporarily incorrect pointer due to a concurrent process modifying an intermediate node.

As used herein, a latch refers to a lock t protects an in-memory data structure or piece of an data structure from inappropriate concurrent access. For example, nodes of B-trees are often each protected with a reader-writer latch that can be held or acquired in either read mode or writ mode. A process holding a latch in, writ mode (also written as "a process that has acquired a latch in writ mode") is called a writer and a process holding a latch in read mode (also written as "a process that has acquired a latch in read mode") is called a reader. Typically, reader-writer latches allow at most one writer, but any number of readers so long as there is no writer. This is because it is typically safe for multiple processes to read data that is not being modified, but typically only safe for one process at a time to modify data.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
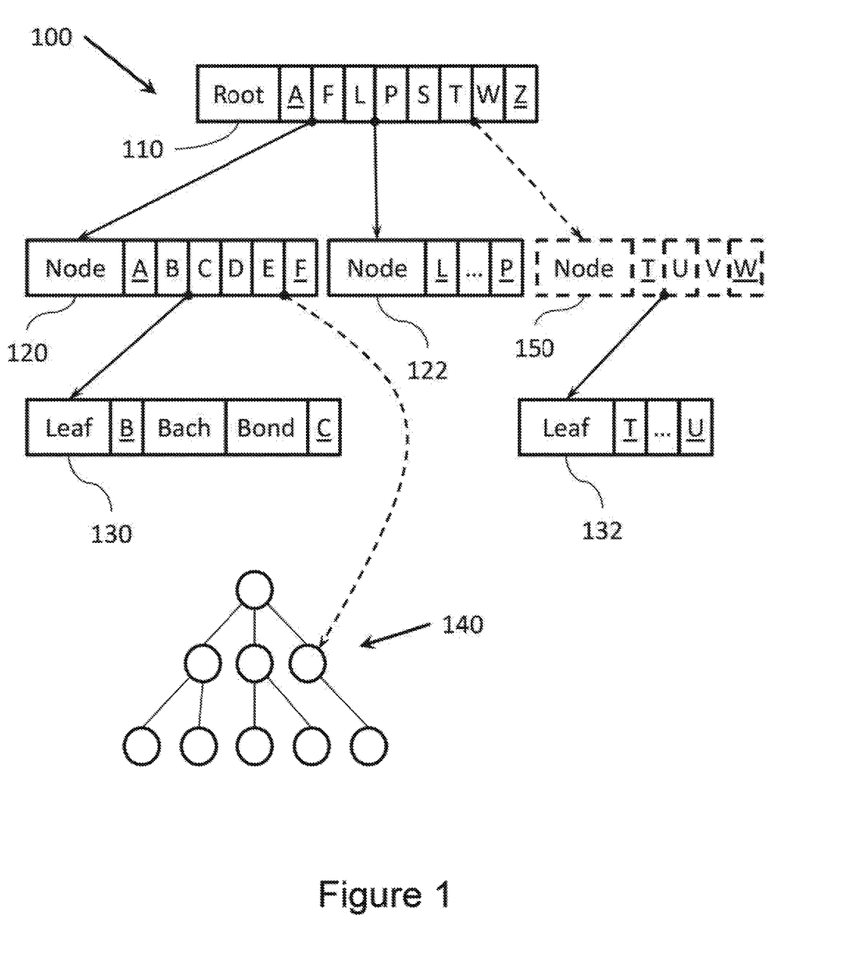
FIG. 1 illustrates example data structures on which example systems and methods, and equivalents, may operate.

FIG. 1 illustrates example data structures on which example systems and methods, and equivalents, may operate. FIG. 1 illustrates a tree-based data structure 100. Tree-based data structure 100 includes several nodes including a root node 110, intermediate nodes 120 and 122, and leaf nodes 130 and 132. Tree-based data structures typically have one or a small number of root nodes. The root nodes may have a number of children nodes, which in turn may have children of their own, and so on. Nodes with no children are referred to as leaf nodes and nodes with children that are not root nodes are referred to as intermediate nodes. Typically, nodes in tree-based data structures have a single parent. Tree-based data structures may be distinguished from list-based data structures (e.g., linked lists) because nodes of tree-based data structures have more than one child. The tree-based data structure may be, for example, a relational database, a key-value store, indexes for information retrieval and contents search, metadata and directory stores in file systems, and so forth.

A person having ordinary skill in the art will appreciate that tree-based data structure 100 has many other nodes and pointers that are not shown. FIG. 1 also illustrates a node 150 that is no longer part of data structure 100. Another tree-based data structure 140 is also shown, though node details are omitted. Selected pointers are also shown using solid lines, as well as several possible paths a search may take if it goes astray using dashed lines.

In this example, tree-based data structure 100 may store data associated with persons and may be organized by last name. Thus, root node 110 is structured so that between various separator keys, shown here as letters, are pointers to intermediate nodes. A pointer between separator keys A and F points to intermediate node 120 and a pointer between separator keys L and P points to intermediate node 122. The tree-based data structure may also be organized so that each node has fence keys, which are indicated via underlining throughout FIG. 1, that describe what content can be reached from that node. Thus, root node 110's fence keys A and Z may essentially indicate that all content may be reached from root node 110, while intermediate node 120's fence keys A and F indicate that content between A and F may be reached from intermediate node 120. Fence keys may also serve as separator keys.

Consequently, a process searching for information relating to a man having the last name Bond would follow the pointer between separator keys A and F in root node 110 to intermediate node 120, and then follow the pointer between separator keys B and C to leaf node 130 which contains, for example, data relating to Mr. Bond. In some examples, the actual data may be located elsewhere in memory and node 120 may contain a pointer to this location.

As mentioned above, conventional systems employ latches to ensure that processes do not go astray due to reading data that is simultaneously being modified by another process. For example, if a process searching for information relating to a person having the last name Edison reads intermediate node 120 while it is being modified by another process, the read of the pointer between separator keys E and F in intermediate node 120 may be bad and cause the process to access memory completely unrelated to tree-based data structure 100. In this example, FIG. 1 illustrates the pointer read by the searching process as pointing to a node in an unrelated tree 140. In a different example, the pointer read by the searching process could point to the wrong leaf node in tree-based data structure 100. The wrong leaf node may be, for example, leaf node 130, which is a part of tree-based data structure 100 but does not contain the data being searched for as "Edison" fails to fall between "B" and "C". In other examples, the pointer could point to a portion of memory that is not associated with any tree-based data structure, to unallocated memory, and so forth.

Therefore, validation may be performed when a process traversing tree-based data structure 100 reaches a leaf node (e.g., leaf node 130). The validation may include ensuring that a key associated with data searched for is between fence keys of the leaf node, along with other checks to ensure that, for example, the leaf node reached is current and associated with the tree-based data structure 100.

Validation may also be performed on intermediate nodes as processes traverse the tree to determine, for example, if the search has gone astray before reaching a leaf node. That said, checks on intermediate nodes that are as thorough as checks on leaf nodes may actually interrupt searches that would successfully complete. By way of illustration, if an out-of-date intermediate node 150 is being replaced, a process may follow a stale version of a pointer between separator keys T and W of root node 110 to out-of-date node 150. This may occur if the searching process read the pointer between separator keys T and W and then another process changed the pointer to point to a node that is replacing node 150. The searching process may still reach the correct leaf node (in this example, leaf node 132) by following a pointer between separator keys T and U in out-of-date node 150. This is because the data in out-of-date node 150 may not have been overwritten, and therefore still point back to a portion of tree-based data structure 100 that is correct. Validation of intermediate nodes that may enhance query completion likelihood may include ensuring that the intermediate node is associated with tree-based data structure 100, that the process had not traversed more nodes than a depth of the tree-based data structure, and so forth.

Figure 2:
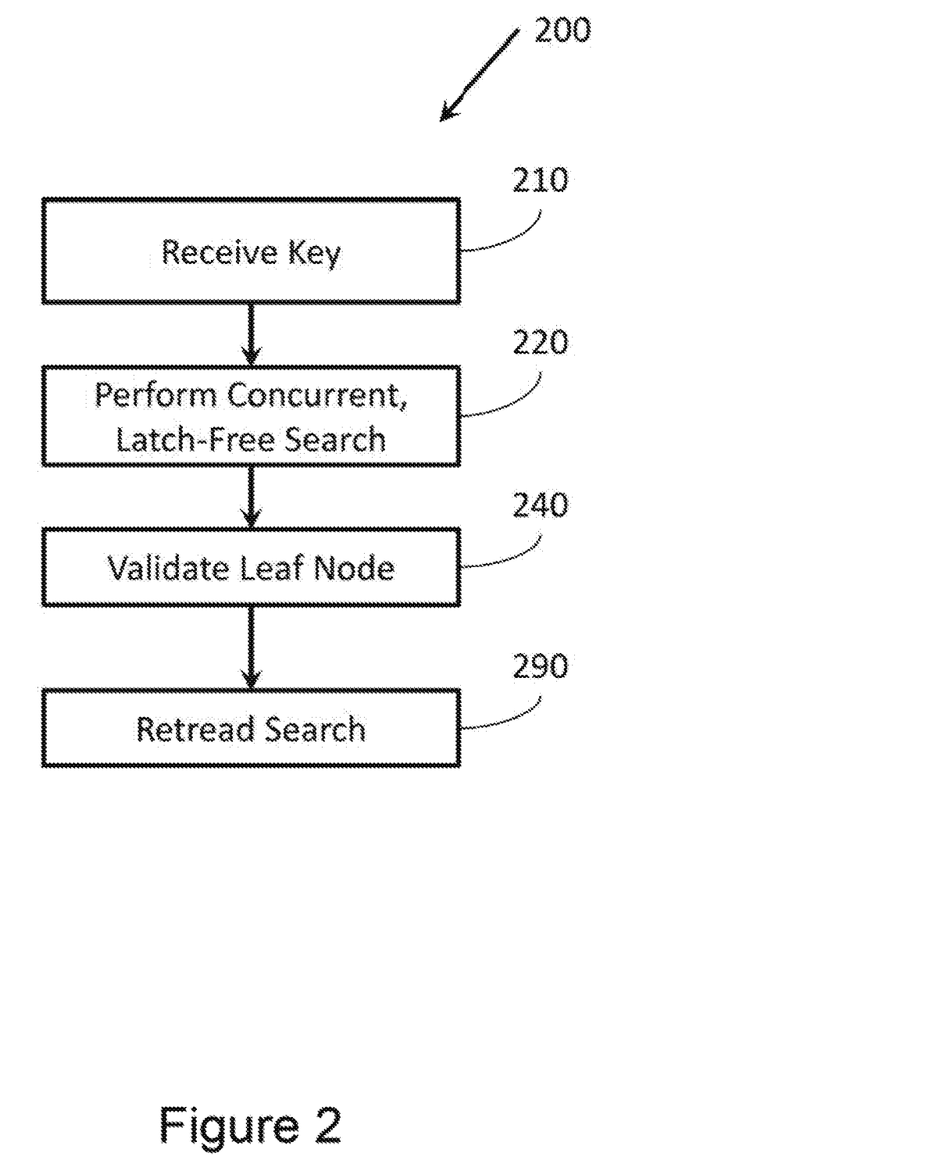
FIG. 2 illustrates a flowchart of example operations associated with latch-free, concurrent searching.

FIG. 2 illustrates a method 200 associated with latch-free, cot current searching. Method 200 includes receiving a key identifying data to be retrieved from a tree-based data structure at 210. By way of illustration, if the data structure stores, data associated with individuals, keys may be, for example,last names. The tree-based data structure may be, for example, a B-tree.

Method 200 also includes performing a concurrent, latch-free search of the tree-based data structure at 220. As used herein, a search is considered concurrent when there are multiple processes operating, on the tree-based data structure at the same time as a process performing the search. These processes may be, for example, searching the tree-based data structure, modifying the tree-based data structure by, for example rearranging nodes of the tree-based data structure, accessing and/or modifying data associated with the tree based data structure, and so forth.

As used herein, a search is considered latch-free when the search is performed without regard for latches on nodes during the traversal of the tree based data structure. Thus, a latch-free search may can that a searching process may traverse a node without acquiring a latch in read mode or writ mode to prevent the node from being modified while the searching process is accessing contents of the node. Similarly, a searching process performing a latch-free search may attempt to read a node whose latch has been acquired in write mode by another process. The concurrent, latch-free search may be performed until a leaf node is reached by the search.

Method 200 also includes validating the leaf node at 240. One goal of validating the leaf node at 240 may be to ensure that if the tree-based data structure contains data associated with the key, then the leaf node reached holds or points to that data. Many different tests for validating the leaf node are possible.

One set of tests for leaf node validation includes evaluating whether the key received by method 200 at 210 is, between fence keys of the leaf node. The set also includes evaluating whether the leaf node is an in use node. A node may be considered in use in some examples if the node contains an identifier (e.g., a flag bit) that identifies the node as being in use. Nodes considered not in use may include nodes that are not currently part of any data structure except, for example, a free space list. Node 150 of FIG. 1 may be an example of such a node. The set also includes evaluating whether the leaf node has a type that matches a type associated with the tree-based data structure. For example, nodes may have a field that indicates what type of data structure it belongs to (e.g., B-tree, linked list, flat file). If this field of a leaf node reached by a searching process indicates that the leaf node has a type that belongs to a data structure type different from that of the data structure being searched, the node may be treated as failing validation. By way of illustration, nodes shown in FIG. 1 may have the same type but other nodes in the system (not shown) may have other types.

The set also includes evaluating whether the leaf node is associated with the tree-based data structure. For example, nodes belonging to a tree-based data structure may have an identification field that holds a value identifying the node as being associated with the tree-based data structure based on, example, an identification value associated with the tree-based data structure. By way of illustration, nodes belonging to data structure 100 in FIG. 1 may have a first value (e.g., 1) in their identification fields, while nodes belonging to data structure 140 may have a second value (e.g., 2) in their identification fields. In one example, evaluating whether the leaf node is an in use node and evaluating whether the leaf node is associated with the tree-based data structure may both be achieved by a single test when nodes are only considered in use when they are associated with a tree-based data structure. By way of illustration, identification fields may hold a special value (e.g., 0) when a node is not currently in use. Thus, checking the value of the identification field of a node to see if the value is the same as the identification value for the data structure being searched may also determine whether the node is in use at the same time.

Other tests for validating the leaf node are also possible. If the leaf node is located at an invalid memory address (e.g., a segmentation fault occurred when a memory access was made), the leaf node may be considered to have failed the validation test. Similarly, if the address of the leaf node is not properly aligned in memory, the leaf node may be treated as failing validation. By way of illustration if nodes in the tree-based data structure have a fixed size of 8196 bytes, and are configured to be stored adjacent in system memory, then if a process realizes the leaf node address is not divisible by 8196, the process may treat that leaf node as failing validation. Similarly, if the leaf node address is to memory that is identified as unallocated, the process may treat a node associated with that memory as failing validation.

A node may also be treated as failing validation if nodes in the tree-based data structure identify themselves (e.g., through a field) as leaf nodes or other types of nodes (e.g., intermediate, root) and a node reached that is believed to be a leaf node does not identify itself as a leaf node. A node may also be treated as failing validation if a checksum associated with the node does not match data associated with the node. A node may also be treated as failing validation if separator keys of a parent of the node do not match fence keys of a node being read. A node may also be treated as failing validation if a number of nodes reached while traversing the tree-based data structure exceeds a depth of the tree-based data structure or a predefined constant. A node may also be treated as failing validation if the node is identified as being marked for deletion. A node may also be treated as failing validation when a depth associated with the node is no one greater than a depth associated with of a parent node that pointed to that node.

Method 200 also includes retreading a portion of the search if the leaf node fails validation at 290. Retreading the portion of the search may comprise returning to a traversed node. The traversed node may have been previously reached during the search. After returning to the traversed node, the search may be continued from the traversed node. In one example, the traversed node may be a root node of the tree-based data structure, essentially restarting the search from the beginning. In some instances, it may be appropriate to acquire and/or observe latches when continuing the search. This may ensure that a valid leaf node is eventually reached if the concurrent latch-free search reaches a leaf node that fails validation.

However, it may also be appropriate to steadily increase the portion of the search that is retreaded. By way of illustration, reaching a wrong leaf node on a first traversal of the tree-based data structure may not necessarily mean that a subsequent pass requires restarting from the root node and observing locks. Instead, reaching the wrong leaf node indicates that another process was modifying the tree-based data structure. As modifications to tree-based data structures may be more likely to occur on nodes closer to leaves of tree-based data structures a more reserved retreading (e.g., from a parent of the leaf node) may be initially appropriate. If retreading the search repeatedly results in reaching the wrong leaf node, a process performing method 200 may then increase backing off (e.g., by retreating further back in the search to higher nodes) and ultimately rely on latches to ensure completion of a query.

In another example, validation may be performed on intermediate nodes of the tree-based data structure (i.e., non-leaf nodes). In this example, a portion of the search may be retreaded upon detecting an intermediate node that fails validation. Many of the tests for validity mentioned above may be applied to intermediate nodes i addition to leaf nodes. However, some tests may not be appropriate because, for example, an intermediate node that was, recently replaced and is marked for deletion, may still have valid pointers that will lead a process performing method 200 to non-deleted nodes associated with the tree based data structure. One feature of many tree-based data structures is that intermediate nodes closer to root nodes are less likely to be modified than intermediate nodes closer to leaf nodes. Thus, validity testing of an intermediate node may be more thorough than validity testing of a parent of the intermediate node.

Figure 3:
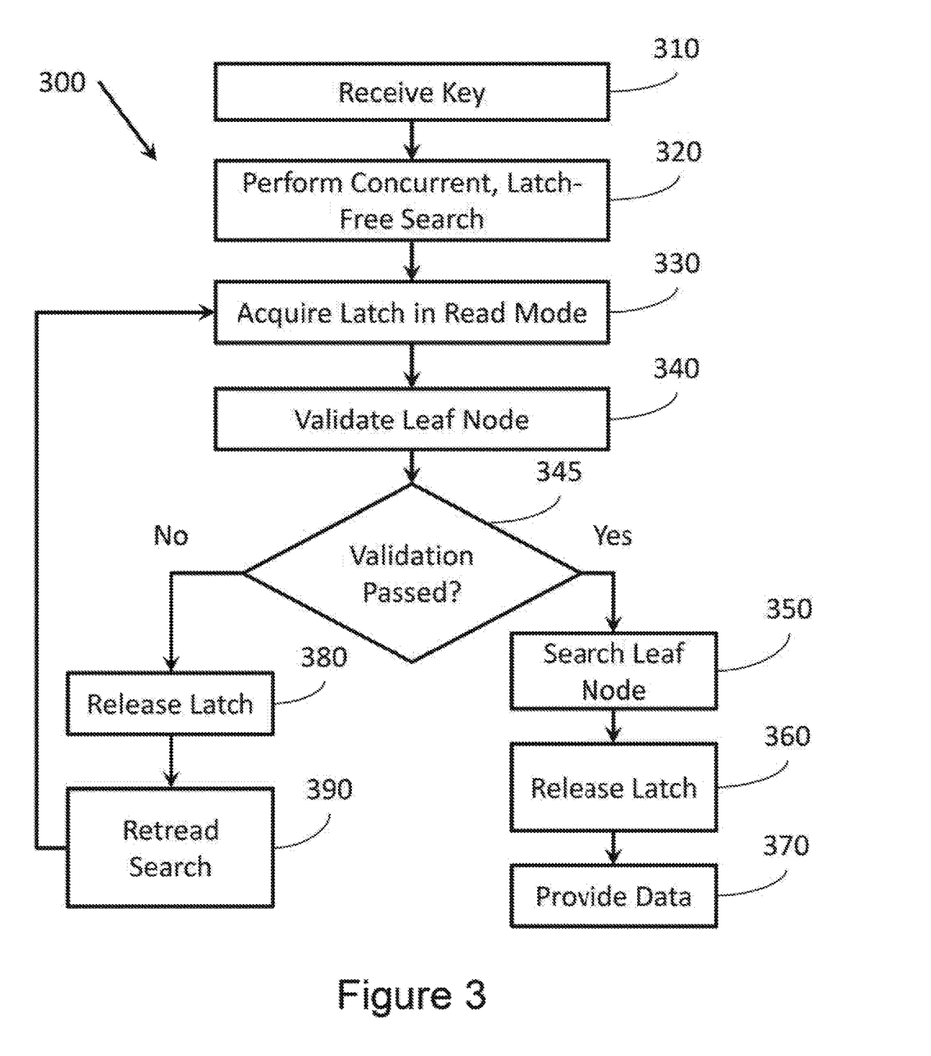
FIG. 3 illustrates another flowchart example operations associated with latch-free, concurrent searching.

FIG. 3 illustrates a method 300 associated with latch-free, concurrent searching. Method 300 includes many actions similar to those described with reference to method 200 (FIG. 2 above). For example, method 300 includes receiving a key at 310, performing a concurrent, latch-free search until reaching a leaf node at 320, validating a leaf node reached by the search at 340, and retreading a portion of the search at 390. Method 300 also contains additional actions.

For example, Method 300 also includes obtaining a latch associated with the leaf node in read mode at 330. This may prevent the leaf node from being modified while the leaf node is being validated or read by a process performing method 300. This may ensure that data provided at action 370 (described below) as not concurrently being modified by another process when it was read at action 350 (described below).

Method 300 also includes evaluating, at 345, whether the leaf node passed the validation at 340 as different actions may be taken if the leaf node passes or does not pass validation at 340. Many different tests for validation of the leaf node are described above. If the leaf node fails validation at 345, method 300 includes releasing the latch associated with the leaf node at 350. When the leaf node fails validation at 345, method 300 also includes retreading a portion of the search at 390, as described above.

Alternatively, the leaf node passes validation at 345, method 300 includes searching contents of the leaf node at 350. The search may be, for example, a binary search on the contents of the leaf node based on the key received at 310. Method 300 also includes releasing the latch associated with the leaf node at 360. If a value matching the key is found within the contents of the leaf node, method 300 includes providing data associated with the key at 370. In another example, a latch may be acquired on the leaf node in write, mode. In this example, data associated with the key may be provided and/or modified depending on what task is being performed on the data.

Figure 4:
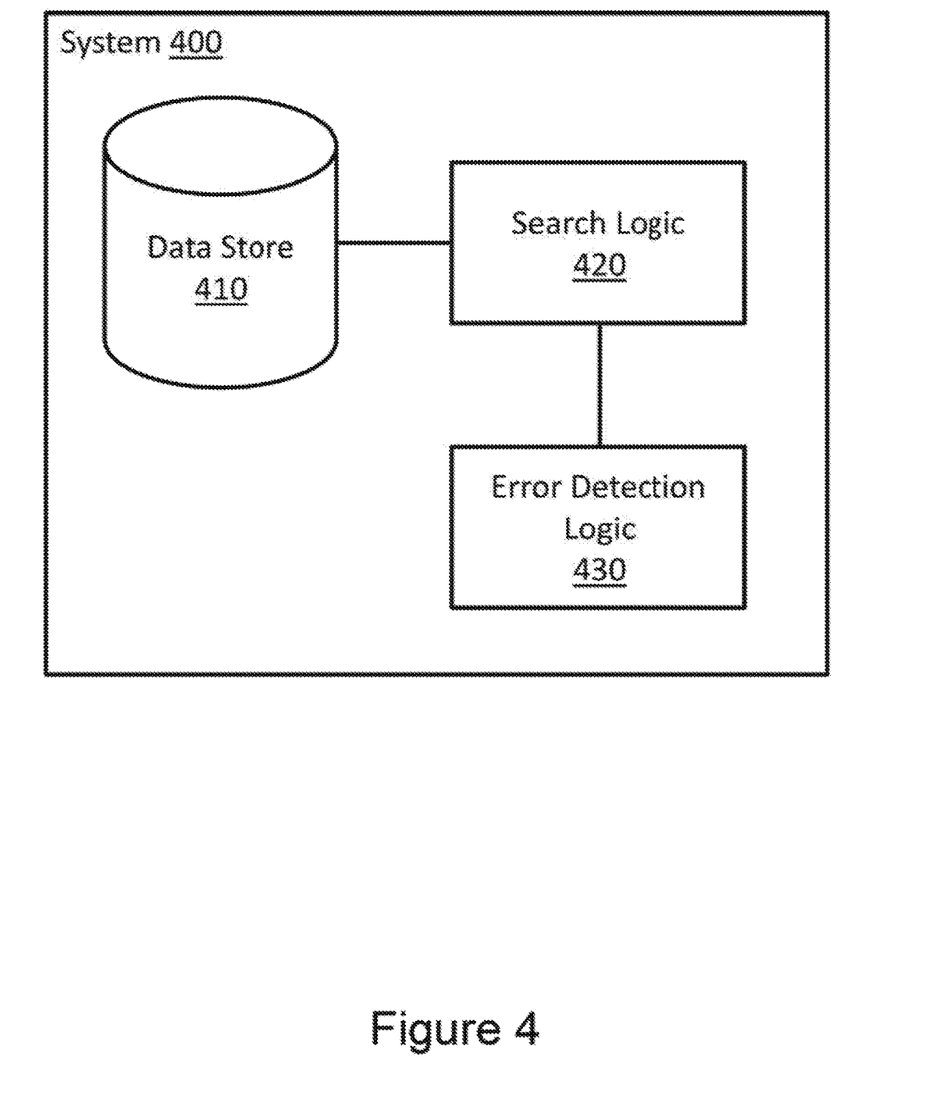
FIG. 4 illustrates an example system for facilitating latch-free, concurrent searching.

FIG. 4 illustrates a system 400 associated with latch-free, concurrent searching. System 400 includes a data store 410. The data store may store a tree-based data structure.

System 400 also includes a search logic 420. Search logic 420 may concurrently traverse the tree-based data structure until reaching a leaf node. The leaf node sought during the traversal may be sought based on a key provided to search logic 420. Search logic 420 may be initially configured to ignore latches while traversing the tree-based data structure. While configured to ignore latches, search logic 420 may refrain from obtaining latches in read mode or write mode on nodes during the traversal. Additionally, while ignoring latches, search logic 420 may read data from a node during the traversal regardless of whether another logic has obtained a latch on that node in write mode.

System 400 also includes an error detection logic 430. Error detection logic 430 may control search logic 420 to return to a traversed node that was previously reached by search logic 420. Detection logic 430 may control search logic 420 to return to that traversed node upon detecting search logic 420 has reached a node that fails validation for the search. The error detection logic may attempt perform validation tests on nodes in the tree-based data structure including intermediate nodes, leaf nodes, and so forth.

In one example, a validation test performed by the error detection logic may be selected based on, for example, a system default, a table default (e.g., different instances of data structures may have different defaults), a query default, a contention history, or a combination thereof. A system default may be a default that applies regardless of the table searched or query performed. A table default may be a default applied whenever a specific table is searched. A query default may be a default associated with a specific type of query. By way of illustration, validity tests for queries that modify data may be defaulted to be more thorough than validity tests for queries that read data. Alternatively, queries that seek more data may be defaulted to have more thorough validity testing than queries that seek less data. Further, a keyword built into a query may cause a process performing the query to perform more thorough validity testing. A contention, history may be historical data regarding how often error detection logic 430 has controlled search logic 420 to return to a previously traversed node. Therefore, as the number or frequency of queries that are forced to retread a portion of the tree-based data structure changes, the thoroughness of validity testing performed by error detection logic 430 may also change.

Additionally, the traversed node to which search logic 420 is controlled to return, may be selected based on, for example, a system default, a table default, a query default, a contention history, or a combination thereof. In one example, error detection logic 430 may control search logic to obtain latches in read mode after returning to the traversed node.

Figure 5:
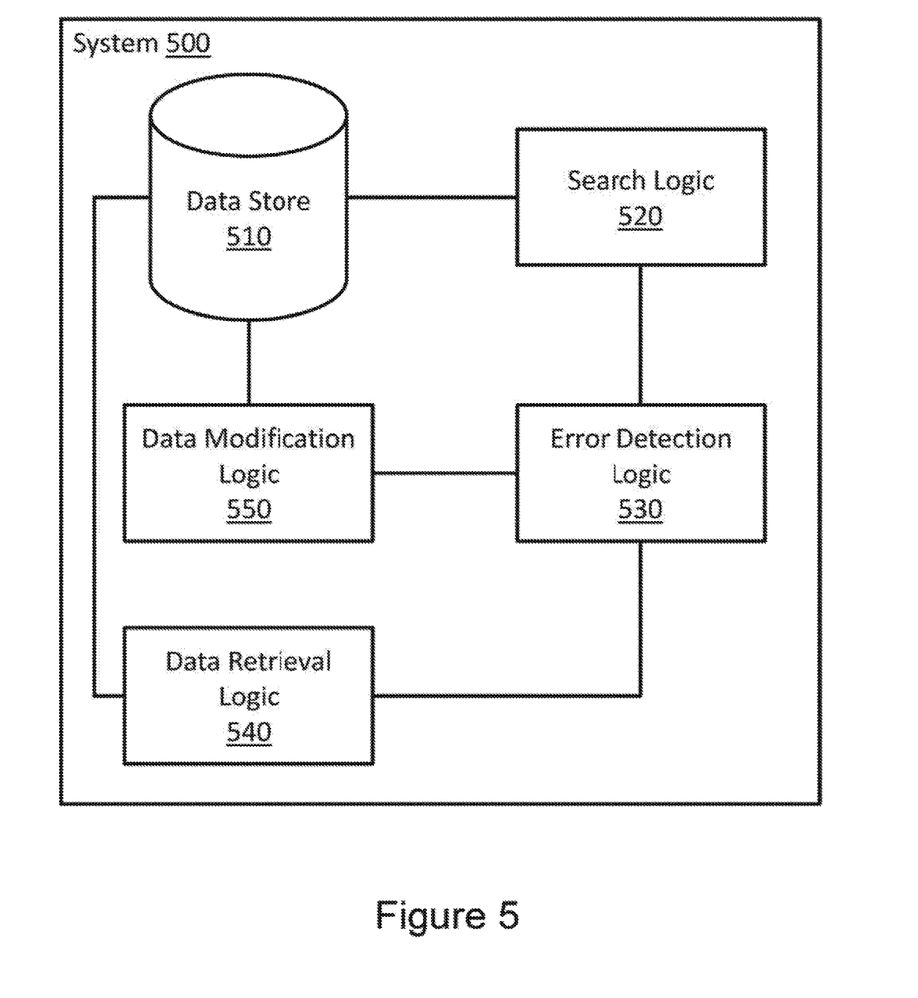
FIG. 5 illustrates another example system for facilitating latch-free, concurrent searching.

FIG. 5 illustrates a system 500 associated with latch-free, concurrent searching. System 500 includes several items similar to those in system 400 (FIG. 4). For example, system 500 includes a data store, 510, a search logic 520, and an error detection logic 530. System 500 also includes a data retrieval logic 540. Data retrieval logic 540 may provide a value from data store 510. The value from data store 510 may be associated with a key provided to search logic 520. The value from data store 510 may be provided when error detection logic 530 validates the leaf node.

System 500 also includes a data modification logic 550. Data modification logic 550 may modify a value in data store 510. The value from data store 510 may be associated with a key provided to search logic 520. The value from data store 510 may be modified or provided when error detection logic 530 validates the leaf node.

Figure 6:
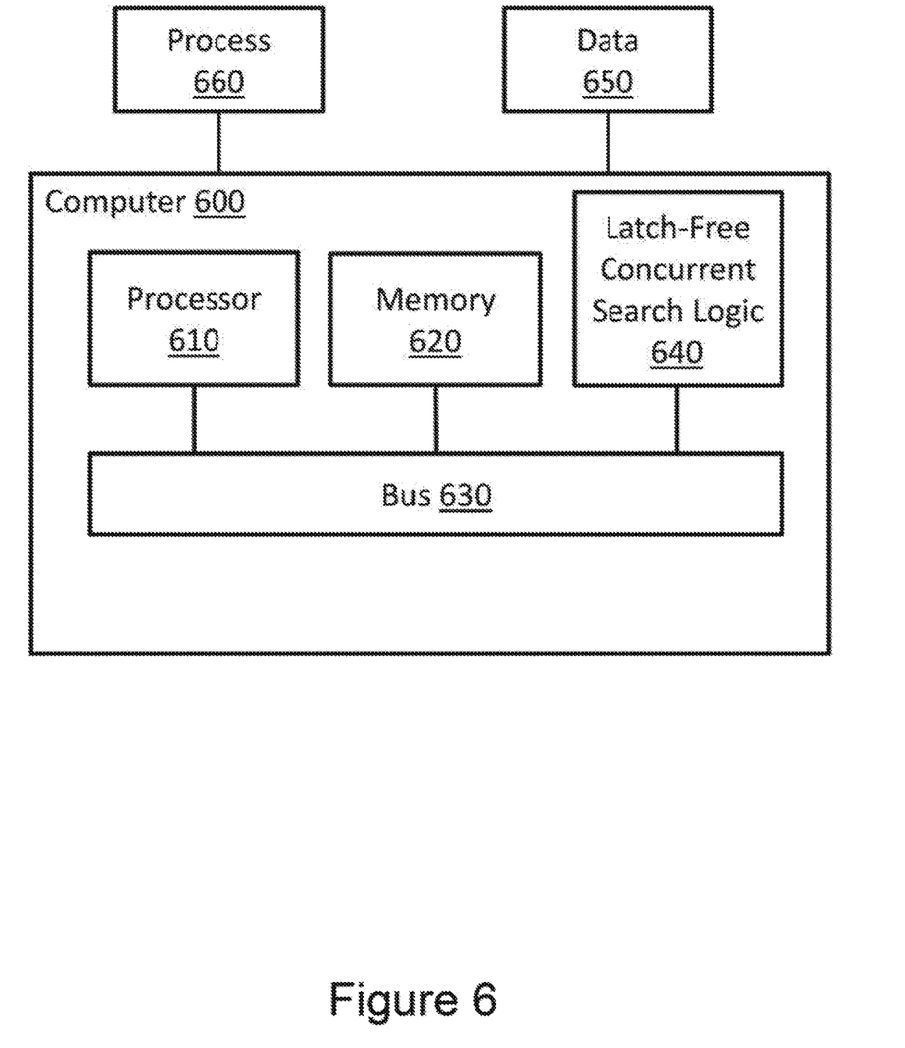
FIG. 6 illustrates an example computing environment in which example systems and methods, and equivalents, may operate.

FIG. 6 illustrates an example computing environment in which example systems and methods, and equivalents, may operate. The example computing device may be a computer 600 that includes a processor 610 and a memory 620 connected by a bus 630. The computer 600 includes a latch-free concurrent search logic 640. In different examples, latch-free concurrent search logic 640 may be implemented as a non-transitory computer-readable medium storing computer-executable instructions in hardware, software, firmware, an application specific integrated circuit, and/or combinations thereof.

The instructions, when executed by a computer, may cause the computer to concurrently search a tree-based data structure for a leaf node based on a key. Latches may be disregarded during the search. The instructions may also cause the computer to validate the leaf node. The instructions may also cause the computer to re-perform a portion of the search when the leaf node fails validation, The instructions may also be presented to computer 600 as data 650 or process 660 that are temporarily stored in memory 620 and then executed by processor 610. The processor 610 may be a variety of various processors including dual microprocessor and other multi-processor architectures. Memory 620 may include volatile memory (e.g., read only memory) and/or non-volatile memory (e.g., random access memory). Memory 620 may also be, for example, a magnetic disk drive, a solid state disk drive, a floppy disk drive, a tape drive, a flash memory card, an optical disk, and so on. Thus, Memory 620 may store process 660 and/or data 650. Computer 600 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computer-implemented method, comprising:
   receiving a key identifying data to be retrieved from a tree-based data structure;
   performing a concurrent, latch-free search of the tree-based data structure until a leaf node is reached;
   validating the leaf node, wherein validating the leaf node comprises determining whether the leaf node passes validation, and determining whether the leaf node passes validation comprises determining at least one of whether the leaf node has a type that matches a type associated with the tree-based data structure or determining whether the leaf node is associated with the tree-based data structure; and retreading a portion of the search if the leaf node fails validation.

2. The computer-implemented method of claim 1, further comprising one or more of providing the data if a determination is made that the leaf node passes validation or modifying the data if a determination is made that the leaf node passes validation.

3. The computer-implemented method of claim 2, further comprising acquiring a latch associated with the leaf node in a read mode, performing a binary search on the contents of the leaf node based on the key to find the data, and releasing the latch associated with the leaf node.

4. The computer-implemented method of claim 1, where retreading the portion of the search comprises returning to a traversed node that was previously reached during the search and continuing the search from the traversed node.

5. The computer-implemented method of claim 4, where the traversed node is a root node of the tree-based data structure and where latches are acquired in read mode when continuing the search.

6. The computer-implemented method of claim 1, further comprising retreading a portion of the search upon detecting an intermediate node fails a validation test.

7. The computer-implemented method of claim 6, where a test for validity of the intermediate node is more thorough than a test for validity of a parent of the intermediate node.

8. The computer-implemented method of claim 1, where the tree-based data structure is organized according to a B-Tree data structure.

9. A non-transitory computer-readable medium storing computer-executable instructions that when executed by a computer cause the computer to:
concurrently search a tree-based data structure for a leaf node based on a key, where latches are disregarded during the search;
validate the leaf node, wherein validating the leaf node comprises determining whether the leaf node passes validation, and determining whether the leaf node passes validation comprises determining at least one of whether has a type that matches a type associated with the tree-based data structure or determining whether the leaf node is associated with the tree-based data structure; and
re-perform a portion of the search when the leaf node fails validation.

10. The computer-readable medium of claim 9, wherein the instructions, when executed by the computer, further cause the computer to perform at least one of providing the data if a determination is made that the leaf node passes validation or modifying the data if a determination is made that the leaf node passes validation.

11. The computer-readable medium of claim 9, wherein the instructions, when executed by the computer, further cause the computer to acquire a latch associated with the leaf node in a read mode, perform a binary search on the contents of the leaf node based on the key to find the data, and release the latch associated with the leaf node.

12. The computer-readable medium of claim 9, wherein the instructions, when executed by the computer, further cause the computer to, in response to the leaf node failing validation, return to a traversed node that was previously reached during the search and continue the search from the traversed node.

13. The computer-readable medium of claim 12, wherein the traversed node comprises a root node of the tree-based data structure, and the instructions, when executed by the computer, further cause the computer to acquire latches in a read mode when continuing the search.

14. The computer-readable medium of claim 9, whereing the tree-based data structure comprises a B-Tree data structure.

* * * * *